United States Patent
Enomoto et al.

(10) Patent No.: US 6,341,151 B1
(45) Date of Patent: Jan. 22, 2002

(54) PREVENTIVE MAINTENANCE METHOD AND APPARATUS OF A STRUCTURAL MEMBER IN A REACTOR PRESSURE VESSEL

(75) Inventors: Kunio Enomoto, Tokai-mura; Katsuhiko Hirano, Hitachi; Eisaku Hayashi, Hitachi; Ren Morinaka, Hitachi; Sadato Shimizu, Hitachinaka; Satoshi Kanno, Hitachi; Shigeru Tanaka, Tokai-mura; Tetsuya Ishikawa, Hitachi, all of (JP)

(73) Assignees: Hitachi, Ltd., Tokyo; Hitachi Engineering Co., Ltd.; Hitachi Ibaraki Business Engineering Co., Ltd., both of Ibaraki, all of (JP)

( * ) Notice: Subject to any disclaimer, the term of this patent is extended or adjusted under 35 U.S.C. 154(b) by 0 days.

(21) Appl. No.: 09/649,988

(22) Filed: Aug. 29, 2000

Related U.S. Application Data

(62) Division of application No. 09/373,213, filed on Aug. 12, 1999.

(30) Foreign Application Priority Data

Aug. 12, 1998 (JP) .............................. 10-227838
Aug. 10, 1999 (JP) .......................... 11-225953

(51) Int. Cl.$^7$ ............................................ G21C 17/00
(52) U.S. Cl. ...................... 376/305; 376/260; 376/261; 376/304; 376/316; 376/340; 376/310; 376/277; 376/249
(58) Field of Search ................................ 376/260, 261, 376/316, 304, 340, 305, 310, 277, 249

(56) References Cited

U.S. PATENT DOCUMENTS

| | | | | |
|---|---|---|---|---|
| 4,421,715 A | * | 12/1983 | Gunter et al. | 376/245 |
| 4,425,298 A | * | 1/1984 | Shields | 376/249 |
| 5,305,361 A | * | 4/1994 | Enomoto et al. | 376/316 |
| 5,318,636 A | * | 6/1994 | Szucs | 134/7 |
| 5,527,204 A | * | 6/1996 | Rhoades | 451/40 |
| 5,553,106 A | * | 9/1996 | Enomoto et al. | 376/305 |
| 5,778,713 A | * | 7/1998 | Butler et al. | 72/53 |
| 6,058,153 A | * | 5/2000 | Kurosawa et al. | 376/249 |

FOREIGN PATENT DOCUMENTS

| | | | |
|---|---|---|---|
| EP | 0218354 A1 | * 8/1986 | .......... C21D/7/06 |
| JP | 4-362124 | 12/1992 | |
| JP | 10-76467 | 3/1998 | |

* cited by examiner

Primary Examiner—Michael J. Carone
Assistant Examiner—John Richardson
(74) Attorney, Agent, or Firm—Mattingly, Stanger & Malur, P.C.

(57) ABSTRACT

A preventive maintenance method and apparatus for a structural member in a reactor pressure vessel according to the present invention reduce a tensile residual stress on a surface of the structural member by impinging a water jet from a nozzle onto a plane surface of a deflector to thereby change direction of flow of the water jet, and impinging the water jet after being deflected onto the surface of the structural member. This method and apparatus are applicable to a narrow space portion, and can improve a residual stress on the surface of the structural member and can also prevent damage such as stress corrosion cracking.

11 Claims, 14 Drawing Sheets

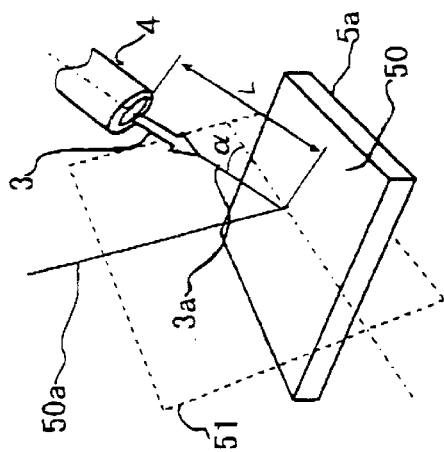
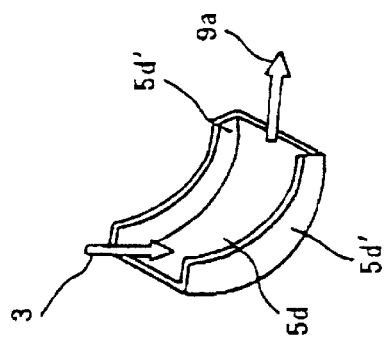
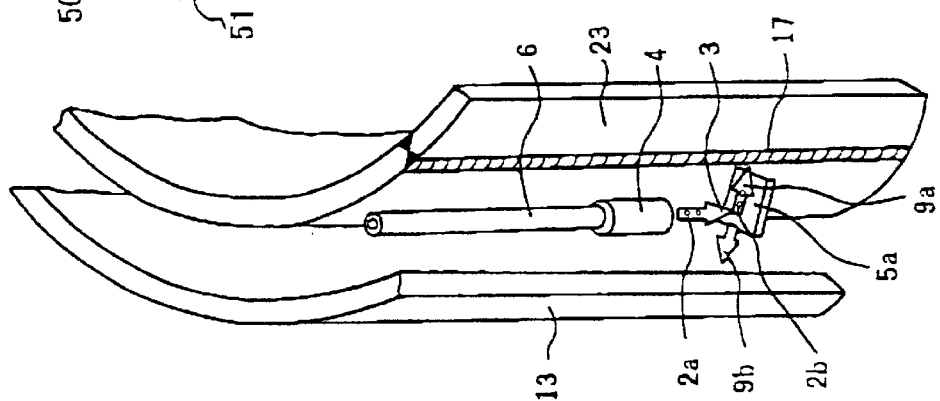
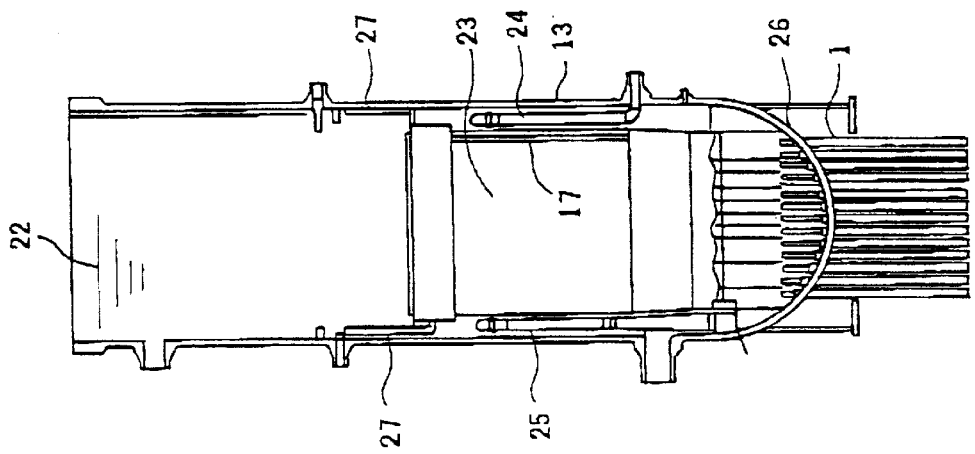

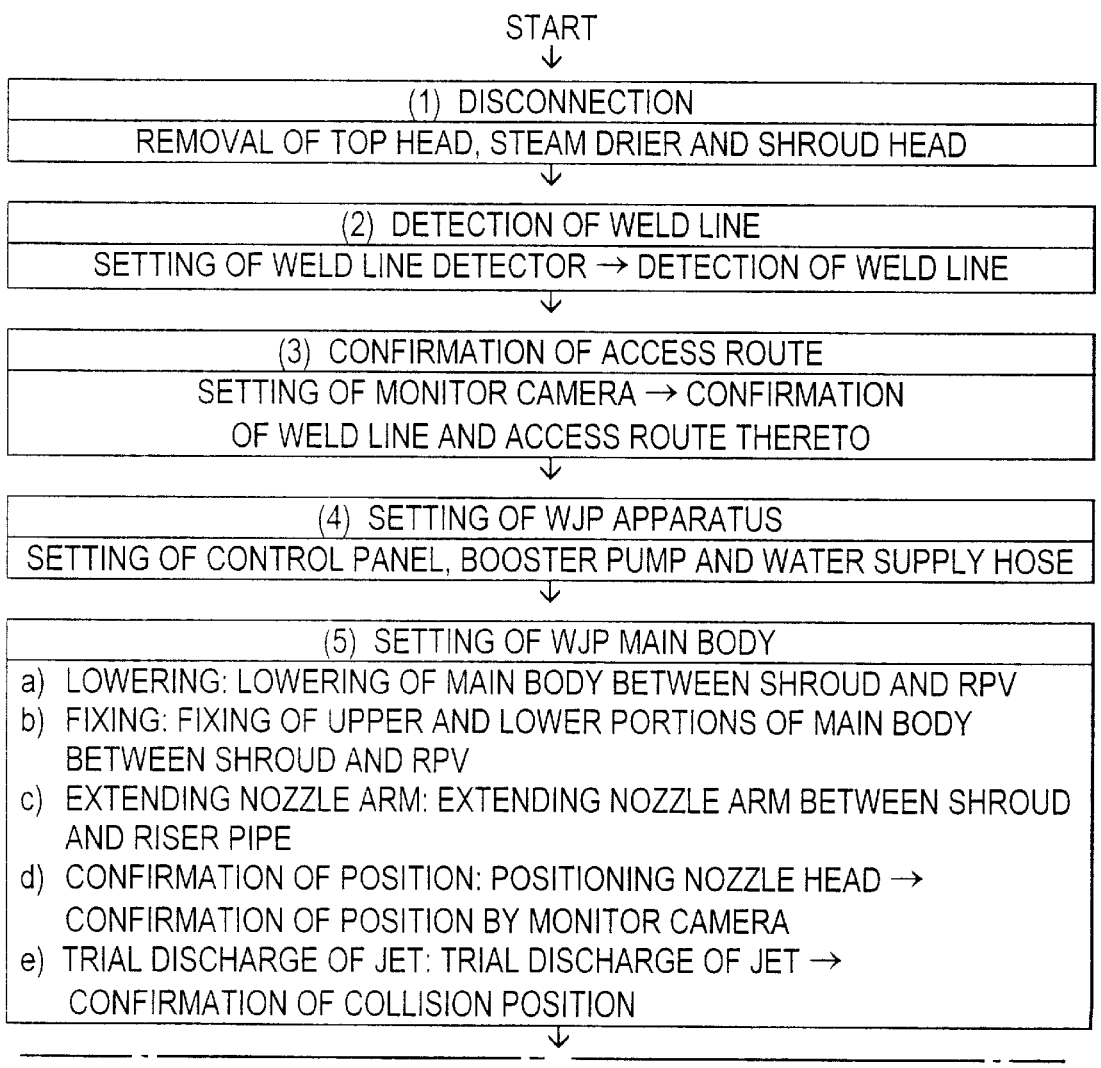

PREVENTIVE MAINTENANCE METHOD AND APPARATUS OF A STRUCTURAL MEMBER IN A REACTOR PRESSURE VESSEL

This is a divisional application of U.S. Ser. No. 09/373,213, filed Aug. 12, 1999.

BACKGROUND OF THE INVENTION

The present invention relates to a preventive maintenance method and apparatus for reducing a tensile residual stress on a surface of a structural member in a reactor pressure vessel (RPV) by discharging a liquid (water) jet to the surface of the structural member, thereby preventing occurrence of stress corrosion cracking (SCC). Particularly, the present invention relates to a method and apparatus suitable for reducing the tensile residual stress of a weld portion and a weld heat-affected zone located in a narrow space or an inaccessible portion.

A water jet peening (WJP) method is known as a method that adds a compressive residual stress to a surface layer of a metal material. In the WJP method, a nozzle is set opposite to the metal material in water, and a water jet containing cavitation bubbles is discharged from the nozzle toward the metal material in the water. When the water jet collides with (or impinges on ) a surface of the metal material, the cavitation bubbles are collapsed by an axial dynamic pressure. When the cavitation bubbles are collapsed, an impact pressure is produced by a water-hammering effect, and this impact pressure strikes the surface of the metal material to add the compressive residual stress.

The first prior art as to the WJP method is disclosed in Japanese Patent Laid-open No. Hei 4-362124. In this method, a WJP is performed by discharging a water jet containing cavitation bubbles from a nozzle which is directed to a metal material in water, and by impinging the water jet on a surface of the metal material while moving the nozzle along the metal material.

The second prior art applicable to an inner surface a tube with a small diameter is disclosed in Japanese Patent Laid-open No. Hei 10-76467. In this case, a high speed liquid jet containing cavitation bubbles is discharged from a nozzle which is directed to an axial direction of a tube, and a conical baffle body which gradually reduces a cross-sectional area of a flow passage in the tube and a columnar baffle body located adjacent to the conical baffle body are coax ally provided on a downstream side from the nozzle.

In a region where the conical baffle body is provided, the cavitation bubbles are collapsed limitedly near an inner surface of the tube because a peripheral pressure of the jet gradually increase by a restriction effect of the flow passage. Fine cavitation bubbles, which are not collapsed in the above region, become nuclei of other cavitation bubbles in a local low pressure area produced by a separation phenomenon of the jet flow at a transition corner from the conical baffle body to the columnar baffle body, and generate secondary cavitation bubbles. This secondary cavitation bubbles are collapsed at a downstream side from the corner. This document also shows one example of the conical baffle body which has an apex angle of 60° in a longitudinal cross section.

The above two methods are intended to subject a metal surface to peening treatment using collapse pressures of cavitation bubbles so as to convert a tensile residual stress which initially presents in a surface layer of the metal material into a compressive residual stress.

However, the first WJP method is carried out by discharging the jet from the nozzle provided opposite to the metal material while moving the nozzle along the metal material. Accordingly, this WJP method is difficult to apply to a narrow space portion such as an outer surface of a core shroud and an inner surface of a tubular structure with a small diameter such as an in-core monitor (ICM) housing in a RPV.

The second Was method is applicable to the ICM housing, but can not apply to the narrow space portion such as the outer surface of the core shroud. Further, in a case that the second WJP method applies to the ICM housing, the restriction effect of the flow passage becomes almost uniform in a peripheral direction in the region where the conical baffle body is provided, but an effect of generating a peeling flow by collision of the jet is not obtained.

Therefore, since the cavitation bubbles do not grow so largely, a local impact pressure (collapse pressure) applied to the inner surface of the tube is restricted (limited). The peeling flow is generated at the transition corner from the conical baffle body to the columnar baffle body, but since the corner has an obtuse angle in a longitudinal cross section, strength of the peeling flow is also restricted.

SUMMARY OF THE INVENTION

It is an object of the present invention to provide a preventive maintenance method and apparatus of a structural member in a reactor pressure vessel (RPV), capable of applying to a narrow space portion such as an outer surface of a core shroud and an inner surface of a tubular structure with a small diameter such as an in-core monitor (ICM) housing in the RPV filled with core water, and also capable of producing cavitation bubbles with high collapse pressures, and improving a residual stress on a surface of the structural member by collapsing the cavitation bubbles at a desired surface of the structural member, thereby preventing a damage such as stress corrosion cracks (SCC).

A water jet, which has collided with (or impinged on) a wall surface in a direction substantially perpendicular thereto and has influenced by the collision (or the impingement), is particularly called a collision jet. In such a collision jet, a separation flow more violent (stronger) than that caused by collision with a portion having a simple discontinuous shape is produced by an vortex flow and a turbulent flow.

As a result, when the water jet collides with the wall surface, part of cavitation bubbles contained in the water jet collapse at the wall surface. But remaining fine cavitation bubbles grow near the wall surface and new cavitation bubbles are generated near the wall surface. The present invention is based on such a feature of the collision jet.

In accordance with the present invention, a preventive maintenance method of a structural member in a reactor pressure vessel for reducing a tensile residual stress on a surface thereof, has the steps of impinging a water jet from a nozzle onto a plane surface of a deflector to thereby change direction of flow of said water jet, and impinging the water jet after being deflected onto the surface of the structural member.

In this case, since it need not to direct the nozzle to the surface of the structural member, if a spatial width of a narrow space portion (or an inner diameter of a tube with a small diameter) is larger than an outer diameter of the nozzle, this method is applicable to the narrow space portion (or the tube with the small diameter).

Further, since the water jet from the nozzle becomes a collision jet including a strong separation flow and a strong vortex flow by the impingement on (or collision with) the plane surface of the deflector, cavitation bubbles contained in the collision jet grow largely (become large). As a result of a combination of this effect and a strong water-hammering effect on the surface of the structural member, the cavitation bubbles in the collision jet give high collapse pressures to the surface of the structural member when the cavitation bubbles collapse on the surface of the structural member. That is, a high compressive residual stress can be added to the surface of the structural member. Accordingly, it can be possible to improve a residual stress on the surface of the structural member and also prevent a damage such as SCC.

Preferably, a distance between the nozzle and the plane surface of the deflector is at most 100 times (preferably at most 50 times) as large as a hole diameter of the nozzle. In this case, since the water jet collides with the plane surface of the deflector before fine cavitation bubbles contained in the water jet become large and velocity of the water jet becomes low, it is possible to reduce the amount of the cavitation bubbles collapsed by the collision with the plane surface of the deflector, and also make the fine cavitation bubbles largely grow by a collision effect with the plane surface of the deflector. Accordingly, the cavitation bubbles having high collapse pressures can be collapsed on the surface of the structural member.

Preferably also, an angle formed between a central axis passing through an opening of the nozzle and the plane surface of the deflector is in a range of 10° to 90°, preferably in a range of 40° to 90°, more preferably in a range of 60° to 90°. In this case, since the collision jet including the strong vortex flow and the strong separation flow can be generated, fine cavitation bubbles largely grow and new cavitation bubbles are generated in the collision jet. Accordingly, the cavitation bubbles having high collapse pressures can be collapsed on the surface of the structural member.

In accordance with the present invention, a preventive maintenance method of a structural member in a reactor pressure vessel for reducing a tensile residual stress on a surface thereof, has the steps of impinging a water jet from a nozzle onto a recess of a deflector to thereby change direction of flow of said water jet, and impinging the water jet after being deflected onto the surface of the structural member.

In this case, since flow direction of a collision jet is opposed to that of the water jet from the nozzle and a water-hammering effect becomes much stronger, a strong vortex flow and a strong separation flow are generated in the collision jet. Accordingly, the cavitation bubbles having high collapse pressures can be collapsed on the surface of the structural member.

Preferably, the recess is n shape of cone with an apex angle of at least 90° (preferably at least 120°) in a longitudinal cross sect on thereof.

Further, preferably, the structural member is a core shroud, an in-core monitor housing or a water-level measuring nozzle.

In accordance with the present invention, a preventive maintenance apparatus of a structural member in a reactor pressure vessel for reducing a tensile residual stress on a surface thereof, has a nozzle for discharging a water jet into core water in a reactor pressure vessel, a deflector having a plane surface which is impinged by said water jet to change direction of flow of said water jet discharged from the nozzle, and a support maintaining a predetermined distance between the nozzle and the plane surface of the deflector.

Preferably, the support maintains the distance between the nozzle and the plane surface of the deflector at most 100 times (preferably at most 50 times) as large as a hole diameter of the nozzle. In this case, the nozzle and the deflector supported by the support can access easily to a narrow space portion (or the inside of a tube with a small diameter). Further, a suitable distance between the nozzle and the plane surface of the deflector can be maintained certainly by the support.

Preferably also, the support maintains an angle (collision angle), formed between a central axis passing through an opening of the nozzle and the plane surface of the deflector, in a range of 10° to 90°, preferably in a range of 40° to 90°, more preferably in a range of 60° to 90°. In this case, a suitable collision angle can be maintained certainly by the support.

Preferably also, the support has one opening for discharging the direction-changed flow of the water jet (collision jet), near the plane surface of the deflector. In this case, part of the collision jet flowing toward direction in which the opening is not provided, changes its flow direction toward the opening by making a second collision with an inner wall of the support and are discharged from the opening so as to collide with the surface of the structural member. Cavitation bubbles in the collision jet grow more largely by this second collision. Accordingly, the cavitation bubbles having high collapse pressures can be collapsed on the surface of the structural member.

Preferably also, the support has openings for discharging the direction-changed flow of the water jet near the plane surface of the deflector, the openings being arranged in a peripheral direction with respect to a central axis passing through an opening of the nozzle. In this case, surfaces corresponding to the openings can be treated with a WJP method simultaneously.

Preferably also, further has a pressurized water supply for supplying pressurized water to the nozzle.

In accordance with the present invention, a preventive maintenance apparatus of a structural member in a reactor pressure vessel for reducing a tensile residual stress on a surface thereof, has a nozzle for discharging a water jet into core water in a reactor pressure vessel, a deflector having a recess which is impinged by the water jet to change direction of flow of the water jet discharged from the nozzle, and a support maintaining a predetermined distance between the nozzle and the recess of the deflector.

Preferably, the recess is in shape of cone with an apex angle of at least 90° (preferably al least 120°) in a longitudinal cross section thereof.

Further, preferably, the support has openings for discharging the direction-changed flow of the water jet near the recess of the deflector, the openings being arranged in a peripheral direction with respect to a central axis passing through an opening of the nozzle.

Further, preferably also, the recess of the deflector has spiral grooves or spiral projections for making a revolving flow of the direction-changed flow of the water jet (collision jet) with respect to the central axis passing through the opening of the nozzle. In this case, since the collision jets discharged from the openings of the support are given velocity components in the peripheral direction, the collision jets being uniform in the peripheral direction can be formed. This collision jets are suitable to treat an inner surface of a tubular structure with a WJP method.

Preferably also, further has a pressurized water supply for supplying pressurized water to the nozzle.

BRIEF DESCRIPTION OF THE DRAWINGS

FIG. 1A is a schematic longitudinal sectional view of a RPV in a state that a top head of the RPV, a steam drier and a shroud head are removed.

FIG. 1B is a schematic configuration view showing a state that a WJP method of the present invention is applied to a vertical weld portion on an outer surface of a shroud.

FIG. 1C is a diagram showing a collision angle and a collision distance.

FIG. 1D is a diagram showing another example of a baffle body in FIG. 1B.

DESCRIPTION OF THE PREFERRED EMBODIMENTS

Figure 2:
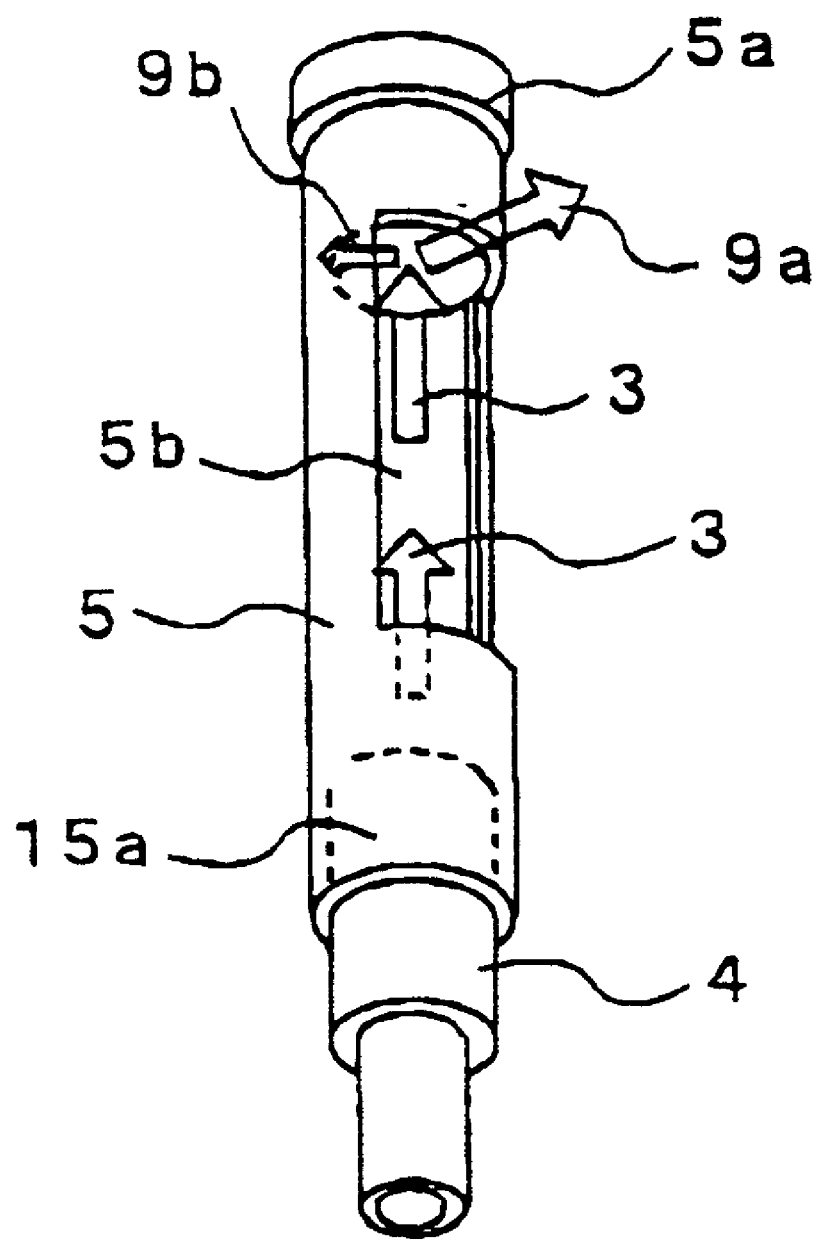
FIG. 2 is a schematic configuration view showing a one-sided discharging type nozzle head of the present invention.

A WJP method (preventive maintenance method) for a vertical weld portion (or line) of a core shroud (hereinafter referred to as "shroud") in a boiling water reactor (BWR) according to the first embodiment of the present invention is explained by FIG. 1. In this embodiment, an object of the WJP is the vertical weld portion on an outer surface of the shroud. The vertical weld portion is one of narrow space portions in a RPV (reactor pressure vessel).

FIG. 1A shows a schematic longitudinal sectional view of the RPV in a state that a top head of the RPV, a steam drier and a shroud head are removed from the RPV. In this state, the RPV 13 is filled with core water 22 and riser pipes 24, jet pumps 25, core cooling pipes 27, etc. are mounted in an annulus portion (a narrow space portion) between the shroud 23 and the RPV 13. in some cases, the vertical weld portion 17 of the shroud 23 is located near the riser pipe 24, and a distance (a spatial width) between the vertical weld portion 17 and the riser pipe 24 is as narrow as about a few tens (20 to 30) mm. In a case that the spatial width is narrow like this, it is impossible to direct a nozzle 4 to the vertical weld portion 17 and to discharge a water jet (hereinafter referred to as "jet") 3 from the nozzle 4. FIG. 1A shows also an ICM housing mounted in a bottom head 26 of the RPV 13.

FIG. 1B is a schematic configuration view which shows a state that the WJP method of the present invention is applied to the vertical weld portion on the outer surface of the shroud. In FIG. 1B, the riser pipe 24 is not shown for simplicity. As shown in FIG. 1B, the nozzle 4 is inserted substantially in parallel to the outer surface of the shroud 23 by moving a lifting means 6 using, for example, a fuel exchanger assisting hoist (not shown).

Pressurized water flows through a hole in the nozzle 4 and is discharged downward from an opening of the nozzle 4 as a jet 3. When the jet 3 is discharged from the opening, cavitation bubbles 2a are generated. This jet 3 containing cavitation bubbles 2a collides with (or impinges on) a plane surface (hereinafter referred to as "a collision surface") of a baffle body 5a provided near the vertical weld portion 17.

The jet 3 changes direction and velocity of its flow by the collision with the collision surface of the baffle body 5a, and collides with the vertical weld portion 17 as a collision jet 9a. That is, the baffle body 5a is a deflector of the jet 3. Although it is omitted in FIG. 1B, practically, a relative position between the nozzle 4 and the collision surface of the baffle body 5a is maintained by a support.

A distance between an end of the nozzle 4 and the collision surface 50 of the baffle body 5a is defined as a collision distance L as shown in FIG. 1C. Strictly, the collision distance L is a distance in a central axis 3a passing through the opening of the nozzle 4. In this embodiment, the collision distance L is set at most 100 times (preferably at most 50 times) as large as a hole diameter of the nozzle 4. This hole diameter means a substantial diameter of the hole in the nozzle 4.

By arranging the nozzle 4 and the baffle body 5a so as to meet the above condition, the jet 3 collides with the collision surface 50 before fine cavitation bubbles contained in the jet 3 become large. Therefore, since the amount (a ratio) of the cavitation bubbles collapsed by the collision with the collision surface 50 is reduced and the jet 3 collides with the collision surface 50 before its velocity becomes low, the collision jet 9a including a strong vortex flow and a strong separation flow is generated.

Accordingly, the fine cavitation bubbles, which are not collapsed by the collision with the collision surface 50, grow in the collision jet 9a and collapse at the vertical weld portion 17 with high collapse pressures, thereby a tensile residual stress of the vertical weld portion 17 can be reduced effectively.

If the collision distance L is set more than 100 times as large as the hole diameter of the nozzle 4, the amount (the ratio) of the cavitation bubbles collapsed by the collision with the collision surface 50 becomes large and the velocity of the jet 3 becomes low. Therefore, the amount (the ratio) of the cavitation bubbles contained in the collision jet 9a is reduced and an improvement effect of the residual stress decreases.

As shown in FIG. 1C, an angle formed the central axis 3a passing through the opening of the nozzle 4 and the collision surface 50 is defined as a collision angle α. Strictly, the collision angle α is a lower (smaller) angle of two angles formed the central axis 3a and the collision surface 50 on a plane 51 including both the central axis 3a and a perpendicular line 50a of the collision surface 50, the perpendicular line 50a passing through an intersection point where the central axis 3a crosses the collision surface 50. The collision angle α is an acute angle except a case that the central axis 3a crosses perpendicularly the collision surface 50.

The collision angle a is needed to be at least 10°. When the jet 3 collides with the collision surface 50, not only the collision jet 9a flowing toward the vertical weld portion 17 but also, for example, a collision jet 9b flowing opposite to the vertical weld portion 17 is generated.

If the collision angle a is set about 10°, since the collision surface has a steep slope (incline) to the vertical weld portion 17, a rate of the collision jet 9a can be higher and a rate of the collision jet 9b can be lower in comparison with a case of α<10°. In this case, however, the vortex flow and the separation flow in the collision jet 9a are not so strong because the water-hammering effect on the collision surface 50 is still weak. Therefore, a long period of time for discharging the jet 3 is needed to attain a desired effect of improving the residual stress.

In this embodiment, the collision angle α is set in a range of 40° to 90° (preferably in a range of 60° to 90°). In this case, since the water-hammering effect on the collision surface 50 becomes strong, the strong vortex flow and the strong separation flow can be generated in the collision jet 9a. Accordingly, it is possible to impinge the collision jet 9a containing the cavitation bubbles with the high collapse pressures on the vertical weld portion 17, and also attain the desired effect of improving the residual stress more effectively.

According to this embodiment, it is easy to indirectly impinge the jet 3 on the vertical weld portion 17 without directing the nozzle 4 to the vertical weld portion 17. When the jet 3 collides with the collision surface 50, part of cavitation bubbles 2a contained in the jet 3 collapse due to an increase of a fluid pressure caused by the water-hammering effect. But the remaining cavitation bubbles, which do not collapse on the collision surface 50, grow to the cavitation bubbles with the high collapse pressures in the collision jet 9a including the strong vortex flow and the strong separation flow.

In the collision jet 9a, in addition to the above mentioned growth of the remaining cavitation bubbles, new cavitation bubbles are also generated and then grow. As a result, the collapse pressure of the collision jet 9a on the vertical weld portion 17 becomes higher, and it is possible to attain the effect of improving significantly the residual stress of the vertical weld portion 17.

FIG. 1D shows another example of the baffle body which is used for changing the direction of the flow of the net 3 in FIG. 1B. This baffle body has a curved surface 5d as the collision surface and jet guids 5d' which are provided at both sides of the curved surface 5d. In a case of using this baffle body, the strong vortex flow and the strong separation flow are generated in the collision jet 9a, and the collision jet 9a containing the cavitation bubbles with the high collapse pressures can collide with (impinge on) the vertical weld portion 17. Further, it is possible to reduce effectively the rate (amount) of collision jet except the collision jet 9a flowing toward the weld portion 17.

One example of a nozzle head, which can discharge a collision jet to almost one direction, according to the present invention is explained by FIG. 2. FIG. 2 shows a schematic configuration view of a nozzle head 15a which is a one-sided discharging type and has a flow baffle 5 with an opening at one side. Hereinafter, this flow baffle is referred to as "a one-sided opening type flow baffle".

This flow baffle 5 is formed into a cylindrical shape and has a square-shaped opening 5b which is formed by cutting out a circumferential part near one end portion of the cylinder. A baffle body 5a is removably engaged with the one end portion of the flow baffle 5 at a position adjacent to the opening 5b in such a manner that a collision jet 9a passing through the opening 5b collides with a surface to be treated. The nozzle head 15a is constructed by engaging removably a nozzle 4 with the other end portion of the flow baffle 5.

Since the baffle body 5a is removably engaged with the flow baffle 5, when the baffle body 5a is worn, it can be easily replaced with a new one. Therefore, reliability of execution of WJP can be maintained. In this nozzle head 15a, a collision distance and a collision angle are set in the above-mentioned range.

In FIG. 2, the Jet 3 collides with the collision surface of the baffle body 5a to change its flow direction, and the collision jet 9a directly collides with the surface to be treated. A collision jet 9b flowing toward direction in which the opening 5b is not provided, changes its flow direction toward the opening 5b by making a second collision with an inner wall of the flow baffle 5, and are discharged from the opening 5b so as to make a third collision with the surface to be treated. In this case, cavitation bubbles in the collision jet grow more largely by this second collision, and the collision jet can restrictively collide with the surface to be treated.

Further, by making fine irregularities on the collision surface of the baffle body 5a, the cavitation bubbles grow largely by the collision with the collision surface having the fine irregularities. This growth of the cavitation bubbles can make a strong peening effect (a strong effect of improving the residual stress) in cooperation with the above mentioned repeated collision.

In FIG. 2, it is possible to replace the cylindrical flow baffle with a square pipe flow baffle. It is also possible to replace the plane collision surface with a curved surface as shown in FIG. 1C.

Figure 3:
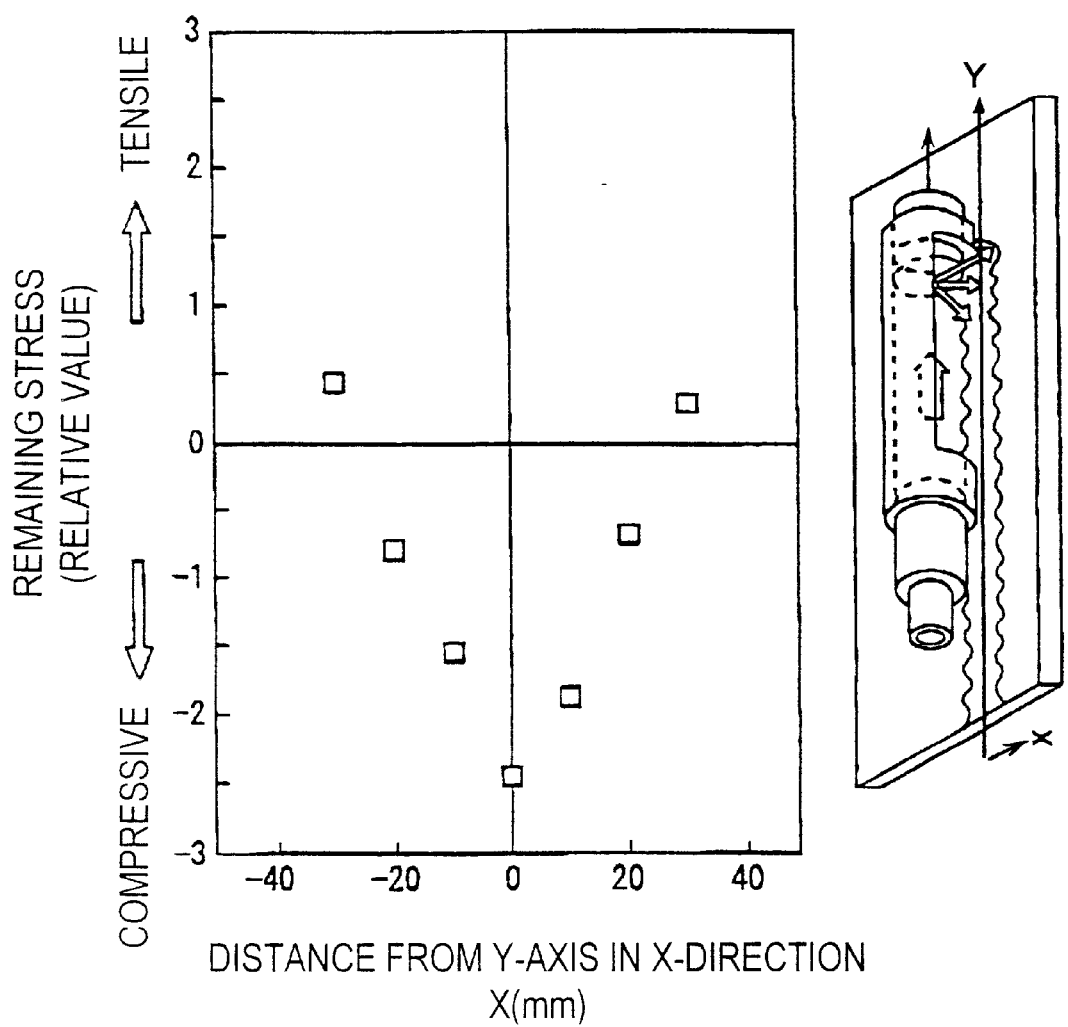
FIG. 3 is a diagram showing one example of an improvement effect of a residual stress by using the one-sided discharging type nozzle head shown in FIG. 2.

FIG. 3 shows one example of an improvement effect of the residual stress by using the one-sided discharging type nozzle head 15a shown in FIG. 2. The nozzle having an outer diameter of 30 mm and a hole diameter of 2 mm is used. The baffle body 5a is arranged so as to make the collision distance of 80 mm and the collision angle of 70°. The one-sided opening type flow baffle 5 has the opening 5b in a half circumferential part.

FIG. 3 shows a measurement result of the residual stress on a surface of a strip-shaped (plate-shaped) test piece after executing the WJP to the test piece using this nozzle head 15a. The WJP is executed in a condition that the nozzle head is moving to a longitudinal direction (Y-direction) by keeping a distance between the nozzle head and the surface of the test piece about 5 mm.

In FIG. 3, a vertical axis is a relative measurement value of the residual stress, and a horizontal axis is a distance from a center line (Y-axis) of the test piece in a width direction (X-direction). A positive residual stress is a tensile residual stress, and a negative residual stress is a compressive residual stress. The surface of the test piece is subjected to surface grinding so as to have a tensile residual stress of about 400 MPa as an initial residual stress. As shown in FIG. 3, the initial tensile residual stress is improved to the compressive residual stress in a range in which the collision jet collides with the surface of the test piece.

Figure 4A:
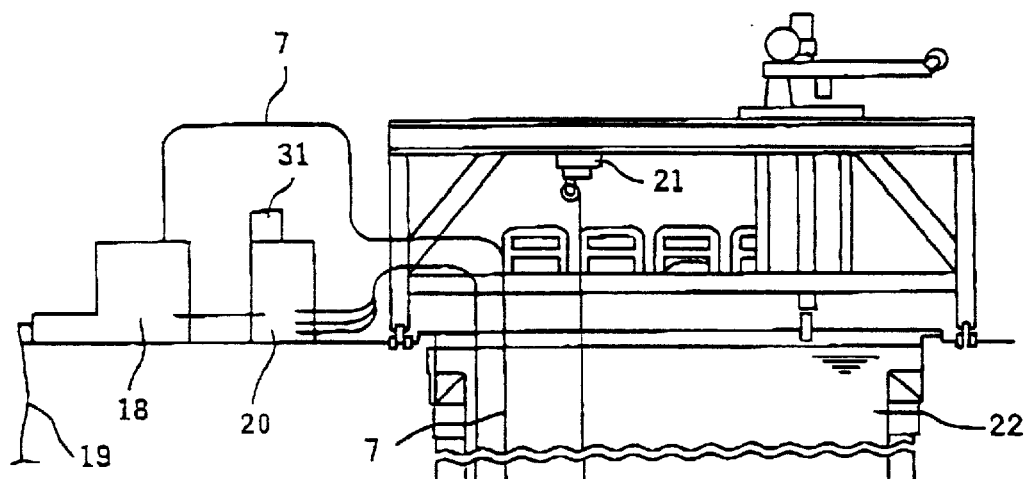
FIG. 4A is a schematic longitudinal sectional view of a surrounding area near a RPV in a state that a WJP method according to the present invention is applied to a vertical weld portion on an outer surface of a shroud (the first embodiment) and a horizontal weld portion of an ICM housing (the third embodiment).
Figure 4B:
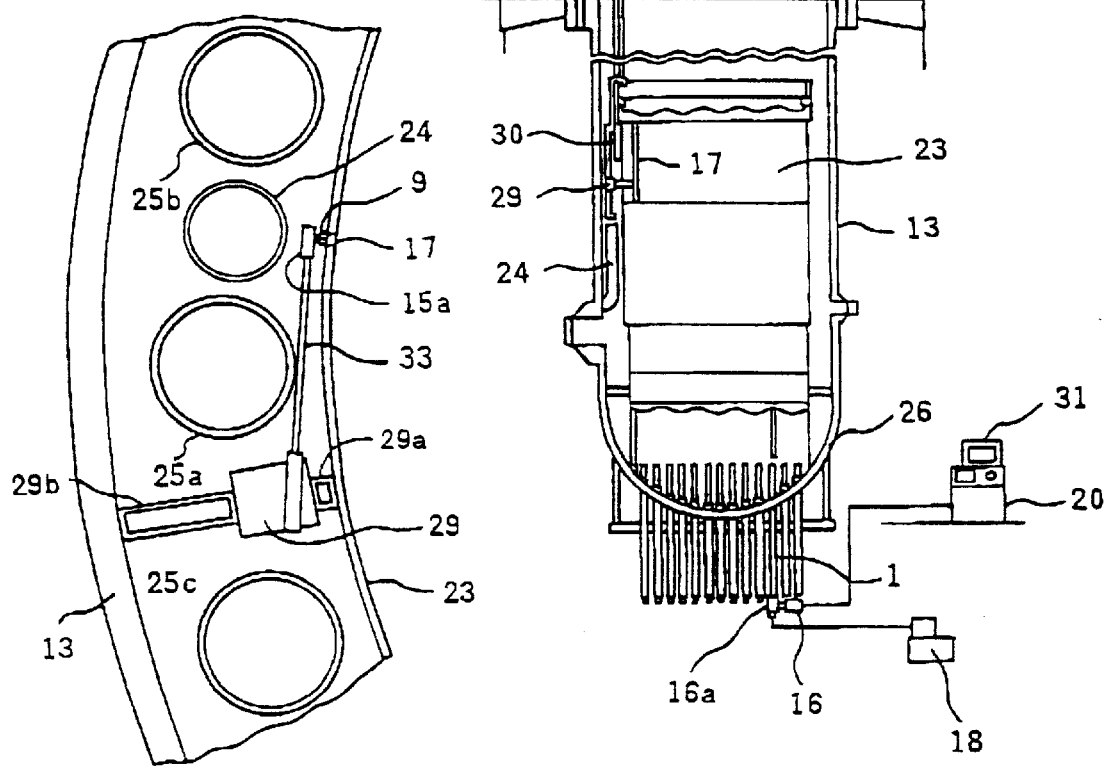
FIG. 4B is a top view of a surrounding area near a WJP main body during executing the WJP in the first embodiment.
Figure 5B:
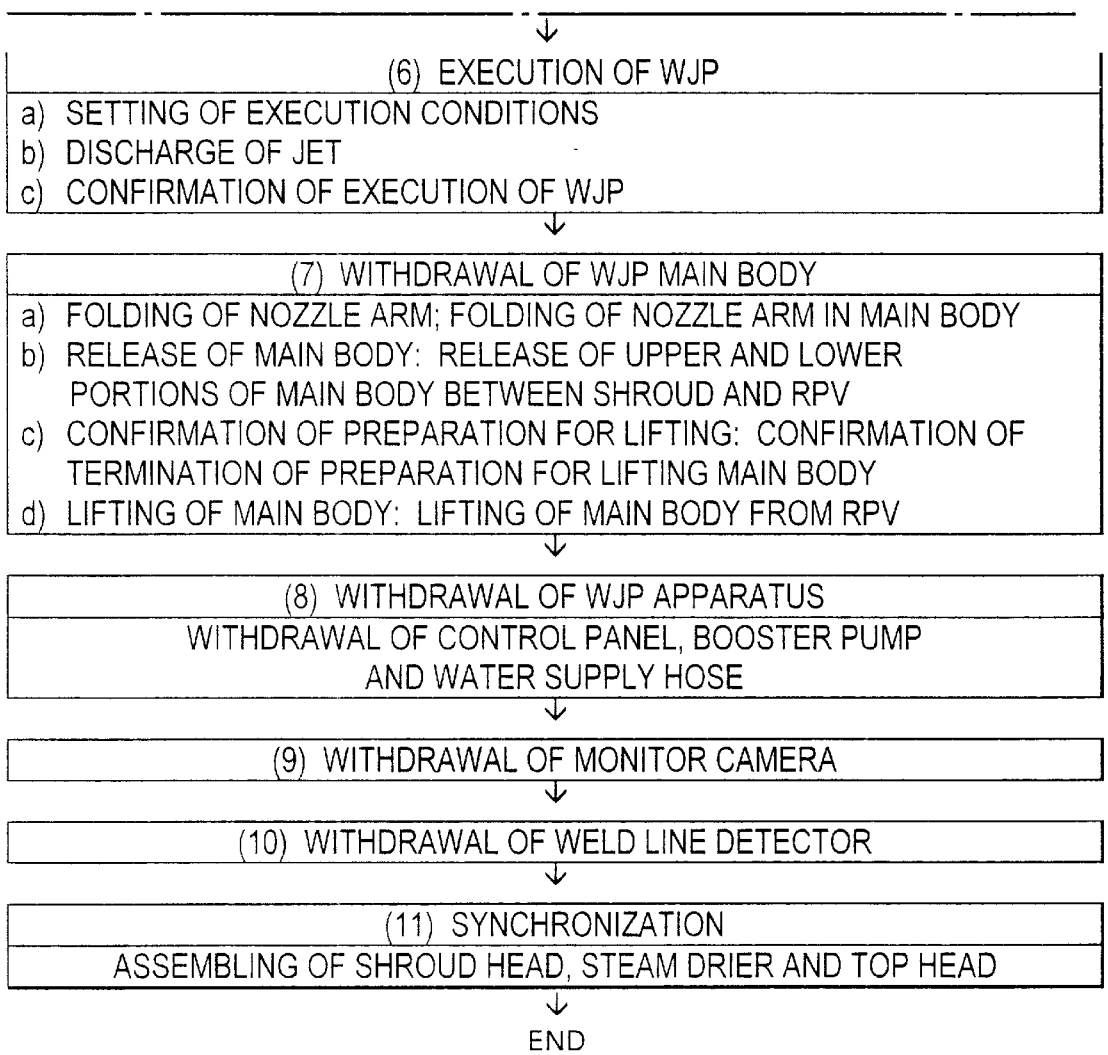
FIG. 5 is a flow chart showing execution steps of the WJP in the first embodiment.

The first embodiment, in which the WJP method according to the present invention is applied to the vertical weld portion on the outer surface of the shroud in a BWR plant after at least the first operation cycle, is explained in more detail using FIG. 4 and FIG. 5. A WJP apparatus having the one-sided discharging type nozzle head 15a with the cylindrical flow baffle 5 is used. The collision distance and the collision angle are set in the above-mentioned range, respectively.

FIG. 4 is a schematic longitudinal sectional view, which shows a state of the WJP execution, of a surrounding area near the RPV. FIG. 4 also shows the third embodiment in which the WJP method according to the present invention is applied to a horizontal weld portion of an ICM housing. FIG. 5 is a schematic flow chart which shows execution steps of the WJP in the first embodiment. Each step is explained below according to the flow chart of FIG. 5.

(1) Disconnection

A top head of the RPV, a steam drier and a shroud head are removed from the RPV. In this state, the RPV 13 and a reactor well are filled with core water 22.

(2) Detection of Weld Line

A weld line detector (not shown) is lowered and set near an outer surface of the shroud using, for example, a fuel exchanger assisting hoist (hereinafter referred to as "assisting hoist") 21. A vertical weld portion (line) is detected by the weld line detector.

(3) Confirmation of Access Route

While a monitor camera 30 is lowered using, for example, the assisting hoist 21, an access route to the weld line 17, presence or absence of an obstacle to set a WJP main body 29, and the weld line 17 are confirmed by means of a monitor video 31. A spatial distance between a riser pipe 24 and the shroud 23 is measured to confirm that a nozzle head can be inserted into the space.

(4) Setting of WJP Apparatus

A control panel 20 and a booster pump 18 are disposed on an operation floor. The booster pump 18 is connected to a source water tank (not shown) by means of a water supply hose 19. The booster pump 18 is connected to the WJP main body 29 by means of a high-pressure hose 7. Wiring between these devices is laid out, and these devices are adjusted.

(5) Setting of WJP Main Body

This step has next steps of a) to e).

a) Lowering

The WJP main body 29 is lowered by the assisting hoist 21 to a specific height in a space between the shroud 23 and the RPV 13. It is confirmed by the monitor camera 30 and the monitor video 31 that the WJP main body 29 is located in a suitable height.

b) Fixing

Upper and lower portions of the WJP main body 29 are fixed on a shroud's side and a RPV's side by a support 29a and a support 29b.

c) Extending Nozzle Arm

A nozzle head 15a fixed at a top end of a nozzle arm 33 is inserted between the shroud 23 and the riser pipe 24 by extending forwardly the nozzle arm 33.

d) Confirmation of Position

A distance between the weld line 17 and the nozzle head 15a and discharging direction are confirmed by the monitor camera 30 and the monitor video 31.

e) Trial Discharge of Jet

A trial discharge of a collision jet 9 is performed to confirm that the collision jet 9 collides with a desired position by the monitor camera 30 and the monitor video 31. It is the last step for setting of the WJP main body 29.

(6) Execution of WJP

This step has next steps of a) to c).

a) Setting of Execution Conditions

A discharging pressure and a flow rate of the jet, and a moving speed and a moving range of the nozzle head 15a are set.

b) Discharge of Jet

The collision jet 9 is discharged and the nozzle head 15a is moved in a vertical direction along the weld line 17 to execute the WJP. This execution state of the WJP is confirmed by the monitor camera 30 and the monitor video 31.

In this state, the schematic longitudinal sectional view of the surrounding area near the RPV is shown in FIG. 4A, and a top view of a surrounding area near the WJP main body 29 is shown in FIG. 4B.

c) Confirmation of Execution of WJP

A state of a surrounding area near the weld line 17 after the execution of the WJP is confirmed by the monitor camera 30 and the monitor video 31 to terminate the execution of the WJP.

(7) Withdrawal of WJP Main Body

This step has next steps of a) to d).

a) Folding of Nozzle Arm

The nozzle arm 33 is folded to be contained in the WJP main body 29.

b) Release of Main Body

The WJP main body 29 fixed between the shroud 23 and the RPV 13 is released.

c) Confirmation of Preparation for Lifting

A termination or preparation for lifting the WJP main body 29 is confirmed by the monitor camera 30 and the monitor video 31.

d) Lifting of Main Body

The WJP main body 29 is lifted by the assisting hoist 21.

(8) Withdrawal of WJP Apparatus

The connection between the booster pump 18 and the source water tank by the water supply hose 19 and the connection between the booster pomp 18 and the WJP main body 29 by the high pressure hose 7 are released, and the wiring between these devices is removed. The apparatuses such as the WJP main body 29, the control panel 20, the booster pump 18, the high pressure hose 7 and the water supply hose 19 are withdrawn.

(9) Withdrawal of Monitor Camera

The monitor camera 30 is withdrawn.

(10) Withdrawal of Weld Line Detector

The weld line detector is withdrawn to terminate the execution of the WJP.

(11) Synchronization

The shroud head, the steam drier, and the top head of the RPV are lowered and assembled to be restored.

By executing (applying) the WJP with the above steps to the vertical weld portion on the outer surface of the shroud in the RPV filled with the core water, it is possible to collapse cavitation bubbles with high collapse pressures on a surface of the vertical weld portion. Accordingly, the residual stress on the surface of the vertical weld portion can be improved and a damage such as the SCC can be prevented.

When the above WJP method is executed during an outage of the BWR plant, since the top head of the RPV, the steam drier and the shroud head are already removed, the execution of the WJP is started from the step (2) and terminated at the step (9). The one-sided discharging type nozzle head 15a can be applied to axial weld lines on both inner and outer surfaces of a weld pipe. Of course, it can be applied to a weld pipe with no weld line.

Figure 6A:
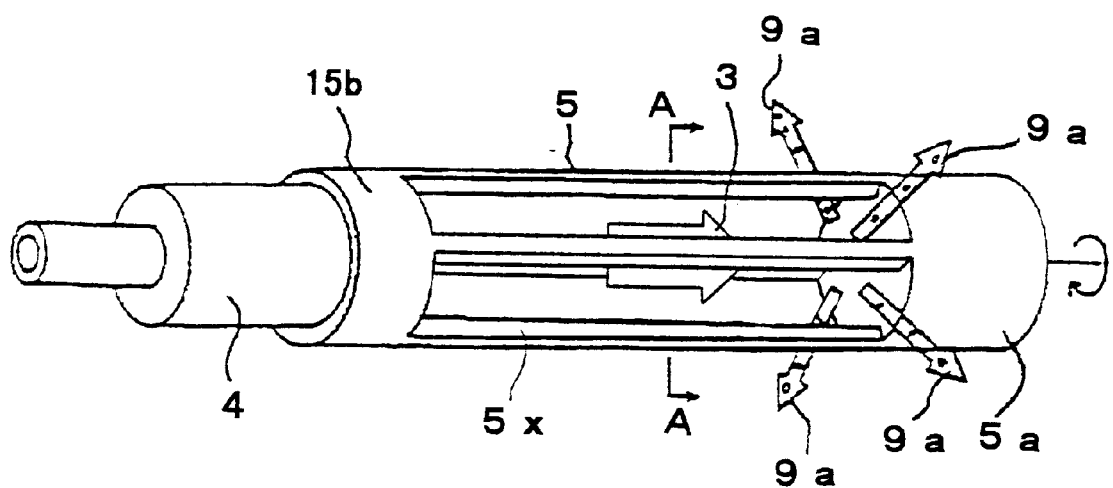
FIG. 6A is a schematic configuration view showing one example of a four-sided discharging type nozzle head according to the present invention.
Figure 6B:
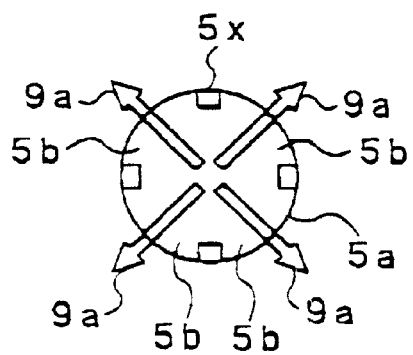
FIG. 6B is an A—A cross sectional view of FIG. 6A.

One example of a four-sided discharging type nozzle head according to the present invention is explained by FIG. 6. FIG. 6A shows a schematic configuration view of this nozzle head, and FIG. 6B shows an A—A cross sectional view of FIG. 6A. This nozzle head 15b has a cylindrical flow baffle 5 with four square openings 5b which are arranged symmetrically in a peripheral direction. Each of four supports 5x forming the openings 5b has a square-shaped cross section.

A baffle body 5a having a flat collision surface is removably engaged with one end portion of the flow baffle 5 at a position adjacent to the openings 5b. A nozzle 4 is removably and rotatably engaged with the other end portion of the flow baffle 5. A collision angle is about 90° and a collision distance is set in the above-mentioned range. Since the baffle body 5a is removably engaged with the flow baffle 5, when the baffle body 5a is worn, it can be easily replaced with a new one. Therefore, reliability of execution of WJP can be maintained.

In this nozzle head 15b, a jet 3 having cavitation bubbles collides with the collision surface of the baffle body 5a and is discharged from the four openings 5b as four collision jets 9a. Therefore, it is possible to execute the WJP simultaneously to a plurality of objects to be treated which are disposed opposite to the four openings 5b. In this case, since velocity of the collision jets 9a in an axial direction becomes almost zero, a strong water-hammering effect and a turbulent flow are generated, and an vortex flow and a separation flow generated in the collision jet become strong.

In this nozzle head 15b, by making width of each opening 5b wider, the collision jets 9a can be discharged in approximately radial directions. In this case, the nozzle head 15b can make an almost omni-directional discharge which is suitable for executing the WJP to an entire inner surface of a cylinder. Therefore, by discharging the jet from this nozzle head to a peripheral weld portion on an inner surface of such a tube with a small diameter, it is possible to execute the WJP simultaneously to the entire peripheral weld portion without rotating this nozzle head from outside. Also, by increasing the number of the openings 5b, the collision jets 9a can be discharged in approximately radial directions.

Further, in this nozzle head 15b, since the openings 5b are made longer in the axial direction, the jet 3 can draw water near the openings 5b. Therefore, since cavitation bubbles contained in the jet 3 can grow largely before the collision with the baffle body 5a, the improvement effect of the residual stress by the collision jet becomes higher.

Figure 6C:
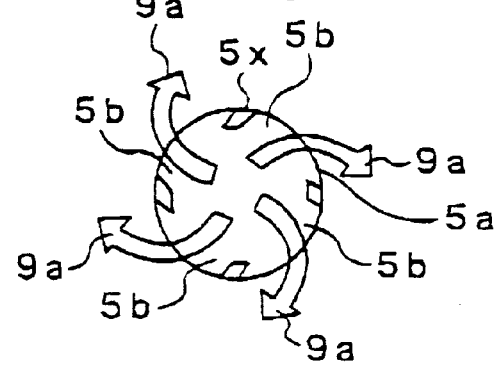
FIG. 6C is a cross sectional view showing another example of a four-sided discharging type nozzle head according to the present invention.

Another example of a four-sided discharging type nozzle head according to the present invention is explained by FIG. 6C. FIG. 6C shows a cross sectional view which corresponds to the A—A cross sectional view of FIG. 6A. In this nozzle head, each of four supports 5x forming the openings 5b has curved sides as shown in FIG. 6C. As a result, the support 5x has an almost parallelogram-shaped cross section. The collision jets 9a become to have velocity components in both a radial direction and a peripheral direction by passing through this openings 5b. That is, the collision jets 9a become a revolving flow.

In this nozzle head, since the collision jets 9a become the revolving flow, the collision jets 9a can go around to portions which are not disposed opposite to the openings. Further, the nozzle 4 is not rotated but the flow baffle 5 is rotated on its axis by a reaction force to the revolving flows. Therefore, this nozzle head is more suitable for executing the WJP to the entire inner surface of the cylinder than that shown in FIG. 6B. That is, this nozzle head can make an almost omni-directional discharge of the collision jets.

Another example of a four-sided discharging type nozzle head according to the present invention is explained by FIG. 7. FIG. 7A shows a cross sectional view which corresponds to FIG. 6B. FIG. 7B and FIG. 7C show a B—B cross sectional view and a C—C cross sectional view of FIG. 7A, respectively. The other elements of this nozzle head are almost the same as FIG. 6A. As shown in FIG. 7A, this nozzle head has a collision surface with four spiral grooves 5c which are symmetrical with respect to an central axis of the collision surface. As shown in FIG. 7C, each groove 5c has a V-shaped cross section.

In this nozzle head, the collision jet 9a discharged from the opening is given a velocity component in a peripheral direction by the groove 5c. That is, the collision jets 9a become a revolving flow. As a result, the collision jets 9a can go around to portions which are not disposed opposite to the openings. Therefore, this nozzle head is also suitable for executing the WJP to the entire inner surface of the cylinder. Further, if the spiral grooves 5c are replaced with spiral projections, the same effect can be attained.

Figure 7A:
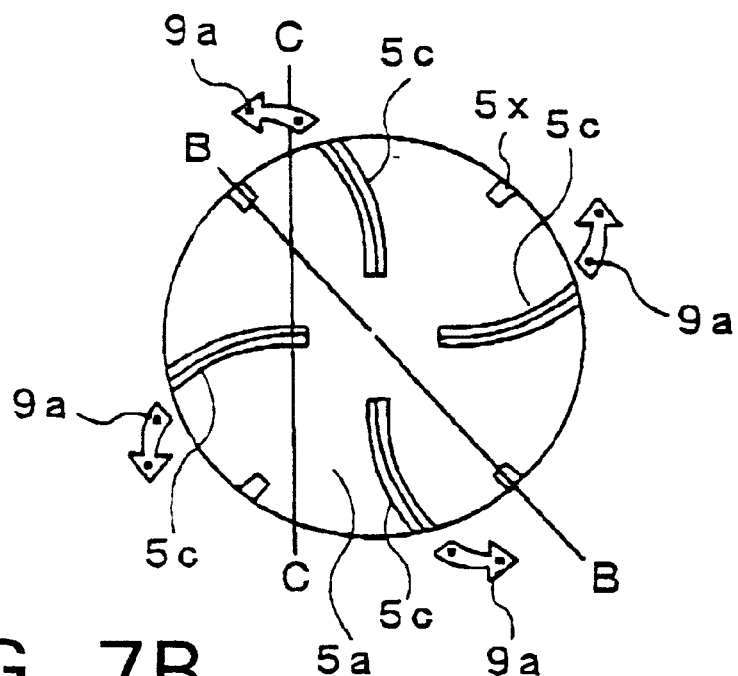
FIG. 7A is a cross sectional view showing another example of a four-sided discharging type nozzle head according to the present invention.
Figure 7B:
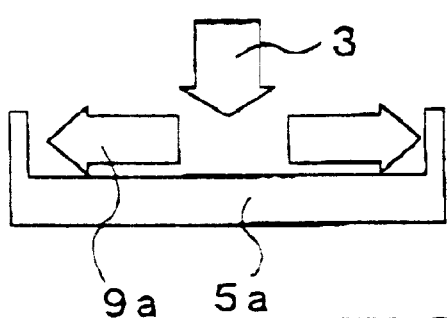
FIG. 7B is a B—B cross sectional view of FIG. 7A.
Figure 7C:
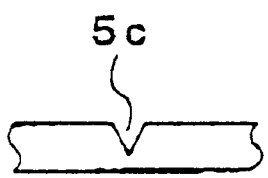
FIG. 7C is a C—C cross sectional view of FIG. 7A.

In FIG. 7A, the spiral grooves 5c are originated from positions which are separated from the central axis of the collision surface. If the spiral grooves 5c are originated from the central axis of the collision surface, since vortex flows and separation flows contained in the collision jets 9a become stronger, the collision jets can become collision jets containing cavitation bubbles with high collapse pressures. Therefore, higher improvement effect of the residual stress can be attained.

Further, by combining the spiral grooves 5c with the supports 5x shown in FIG. 5C, the peripheral velocity component of the collision jet 9a becomes higher and the rotation speed of the flow baffle 5 on its axis also becomes higher. Therefore, the improvement effect of the residual stress can be attained more effectively.

Figure 7D:
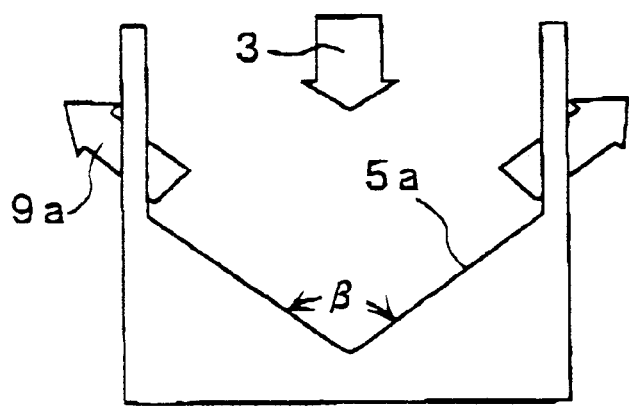
FIG. 7D is a longitudinal sectional view showing another example of a four-sided discharging type nozzle head according to the present invention.

Another example of a four-sided discharging type nozzle head according to the present invention is explained by FIG. 7D. FIG. 7D shows a longitudinal sectional view which corresponds to FIG. 7B. The other elements of this nozzle head are almost the same as FIG. 6A.

This nozzle head has a recessed baffle body 5a which has a recess with a concave cross section as the collision surface. The recess is in shape of cone with an apex angle β of at least 90° (preferably at least 120°) in a longitudinal cross section thereof. When a jet 3 collides with the collision surface, velocity of the jet 3 in a collision direction (a downward direction in FIG. 7D) becomes zero on the collision surface, and then the jet 3 changes to a collision jet 9a with a velocity component in direction (an upward direction in FIG. 7D) opposed to that of the jet 3.

Since a change in velocity from the jet 3 to the collision jet 9 becomes large by setting the apex angle β in the above range, a water-hammering effect occurs strongly on the collision surface. Therefore, part of cavitation bubbles collapse strongly on the collision surface. The remaining cavitation bubbles, which are not collapsed on the collision surface, grow in a strong vortex flow and a strong separation flow included in the collision flow 9a, and are discharged.

Also, in this nozzle head, by forming spiral grooves (or spiral projections) as shown in FIG. 7A on the collision surface, it is possible to give a revolving flow to the collision jet 9a and also generate the vortex flow and the separation flow more strongly. As a result, an improvement effect of the residual stress which is high and almost uniform in the peripheral direction can be obtained.

As a modification of FIG. 7D, the collision surface can be formed into a projecting surface (shape). In this case, the top of the projecting surface breaks a central flow in the jet 3 and generates cavitation bubbles. Further, it becomes easy to form grooves (or projections) like FIG. 7A on the collision surface by machining.

Figure 8:
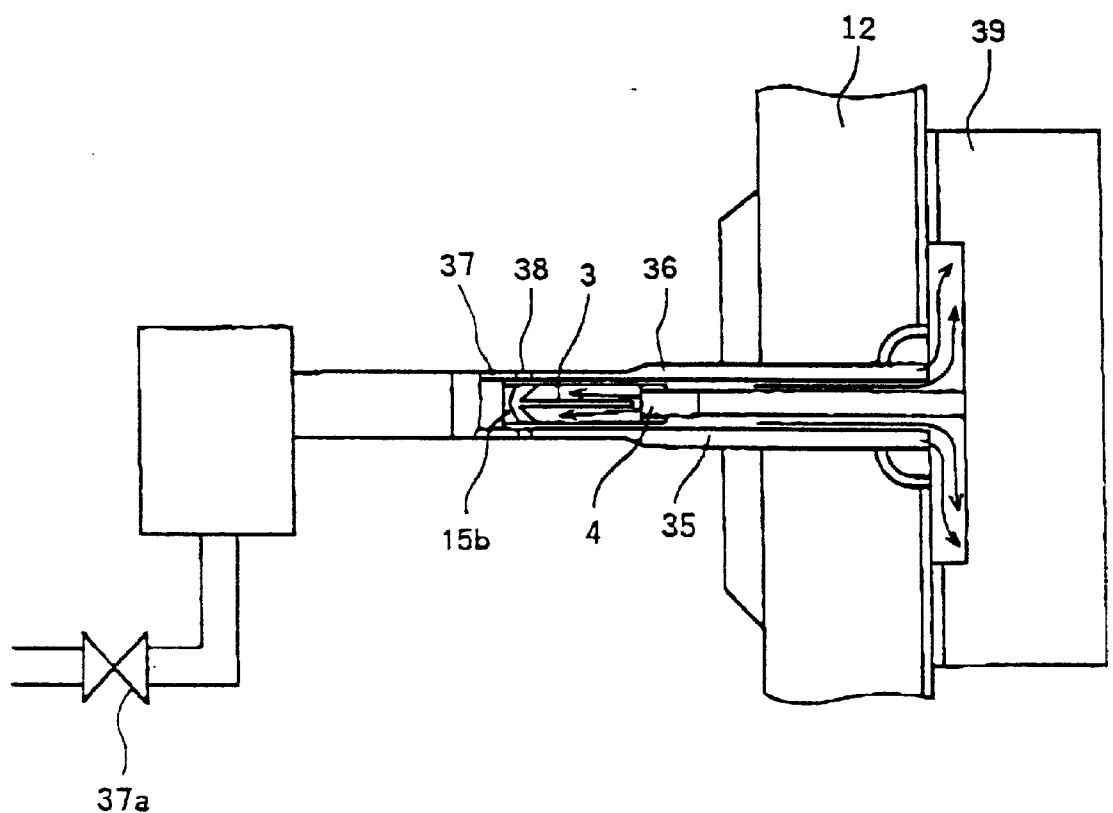
FIG. 8 is a longitudinal sectional view of a water-level measuring nozzle in a state that a WJP method according to the second embodiment of the present invention is applied to a weld portion of the water-level measuring nozzle.

The second embodiment, in which the WJP method according to the present invention is applied to a weld portion of a water-level measuring nozzle in a BWR, is explained using FIG. 8. FIG. 8 is a longitudinal sectional view which shows a state that a nozzle head 15b is set in a water-level measuring nozzle 35. An object of the WJP in this embodiment is a weld portion 38 between a nozzle 36 and a safe end 37 in the water-level measuring nozzle 35 mounted in a RPV 13. The nozzle head 15b shown in FIG. 7D is used in this embodiment.

A central flow (a flow near a central axis) in a jet 3 changes its flow direction by a collision with a central portion of a recessed surface (collision surface) and then flows along the recessed surface, thereby a strong turbulent flow is generated by interference between the direction-changed flow and an outer flow in the jet 3. A collision jet generated like this flows toward the RPV 13 (a right side in FIG. 8) in the water-level measuring nozzle 35, and is finally discharged into the RPV 13 because a leading end of the water-level measuring nozzle 35 is closed with a valve 37a.

Figure 9:
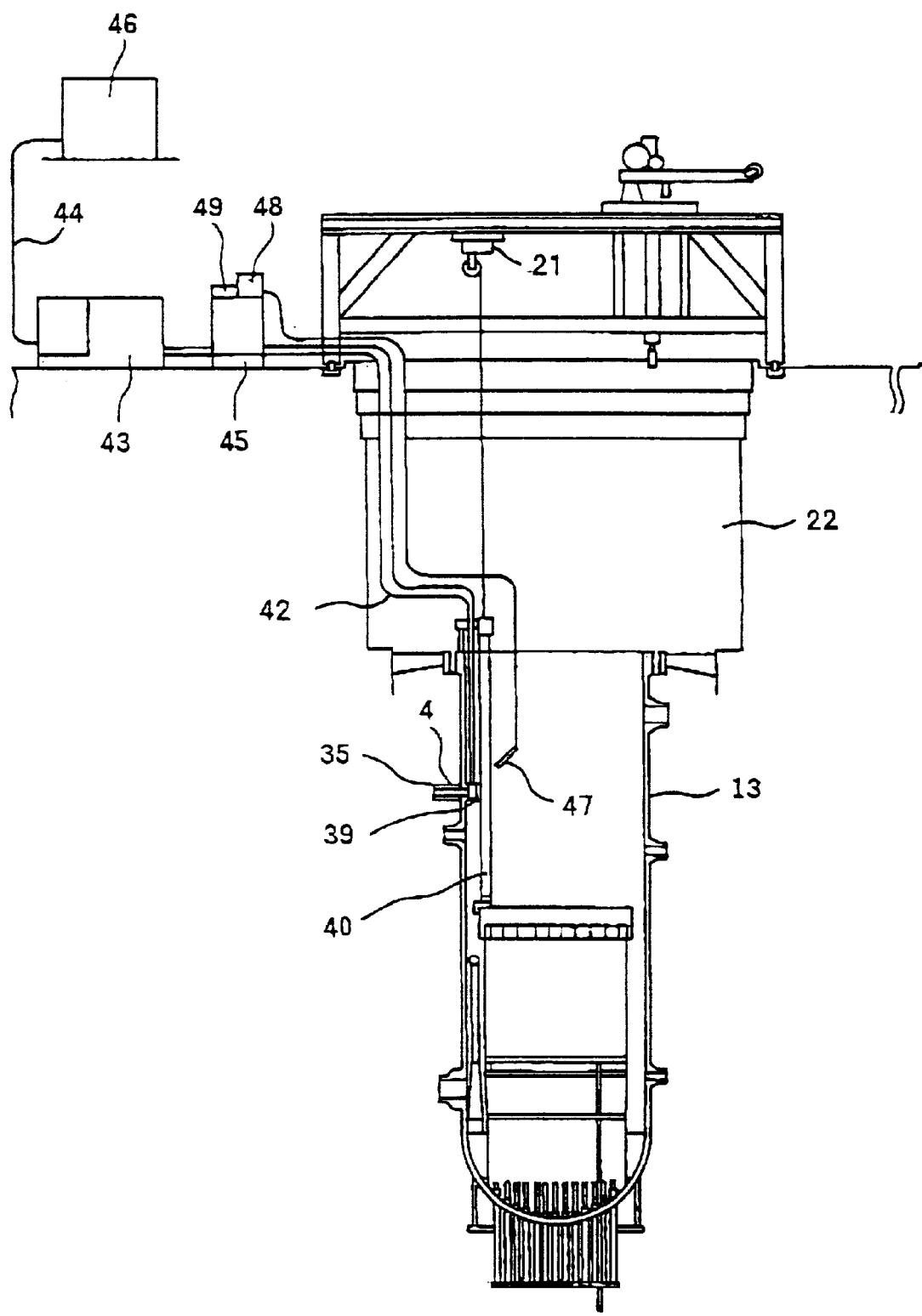
FIG. 9 is a longitudinal sectional view of a surrounding area near a RPV in the same state as FIG. 8.

An apparatus used for execution of the WJP to the weld portion 38 in the water-level measuring nozzle 35 is explained using FIG. 9. This apparatus has a nozzle head drive unit 39 for moving the nozzle head 15b to an object to be treated, a frame 40 for supporting the nozzle head drive unit 39 at a level of the water-level measuring nozzle 35, a high-pressure hose 42 and a booster pump 43 for supplying pressurized water to a nozzle 4, a water supply hose 44 for supplying water to the booster pump 43, and a control panel 45 for controlling the nozzle head drive unit 39 and the booster pump 43.

The WJP is executed using the above apparatus in accordance with the following steps.

(1) Disconnection

A top head of the RPV, a steam drier, a shroud head and fuel assemblies are removed from the RPV. In this state, the RPV 13 and a reactor well are filled with core water 22.

(2) Setting of Nozzle Head Drive Unit

The nozzle head drive unit 39 is mounted on the frame 40. The nozzle head drive unit 39 is lowered in the frame 40 by an assisting hoist 21, and is set at a position of the water-level measuring nozzle 35.

(3) Preparation for Execution of WJP

This step has next steps of a) to c).

a) Setting of WJP Apparatus

The nozzle head 15b mounted at a top end of the nozzle head drive unit 39 is inserted in the water-level measuring nozzle 35. The control panel 45 and the booster pump 43 are disposed on an operation floor. The booster pump 43 is connected to a source water tank 46 by the water-supply hose 44. The booster pump 43 is connected to a WJP main body by the high-pressure hose 42. Wiring between these devices are laid out, and these devices are adjusted.

b) Setting of Execution Conditions

A flow rate and a discharging period (time) of the jet, a moving speed and a moving range of the nozzle head in an axial direction, and a turning speed and a turning range of the nozzle head in a peripheral direction are set.

c) Confirmation of Operation of Apparatus

The nozzle head 15b is moved according to the setting conditions in a head 15b is moved according to the setting conditions in a state in which the jet is not discharged, to confirm whether or not the execution range is suitable, the nozzle head 15b is smoothly moved, and the like.

(4) Execution of WJP

A jet is discharged to start the execution of the WJP.

(5) Confirmation of Execution of WJP

This step has next steps of a) to b).

a) Removal of Nozzle Head

The nozzle head 15b is removed from the water-level measuring nozzle 35.

b) Confirmation of Execution of WJP

A monitor camera 47 is inserted in the water-level measuring nozzle 35. It is confirmed by a monitor TV 48 that the WJP is suitably executed. The suitably executed state is recorded in a monitor video 49.

(6) Withdrawal of WJP Apparatus

This step has next steps of a) to b).

a) Withdrawal of Monitor Camera

The monitor camera 48 is removed from the water-level measuring nozzle 35 to be withdrawn.

b) Withdrawal of WJP Apparatus

Piping and wiring between the above devices are removed. The devices, pipes for piping, and wires for wiring are withdrawn.

(7) Synchronization

The fuel assemblies, the shroud head, the steam drier, and the top head of the RPV are lowered and assembled to be restored.

By executing (applying) the WJP with the above steps to the weld portion of the water-level measuring nozzle in the RPV filled with the core water, it is possible to collapse cavitation bubbles with high collapse pressures on a surface of the weld portion. Accordingly, the residual stress on the surface of the weld portion can be improved and a damage such as the SCC can be prevented.

Figure 10:
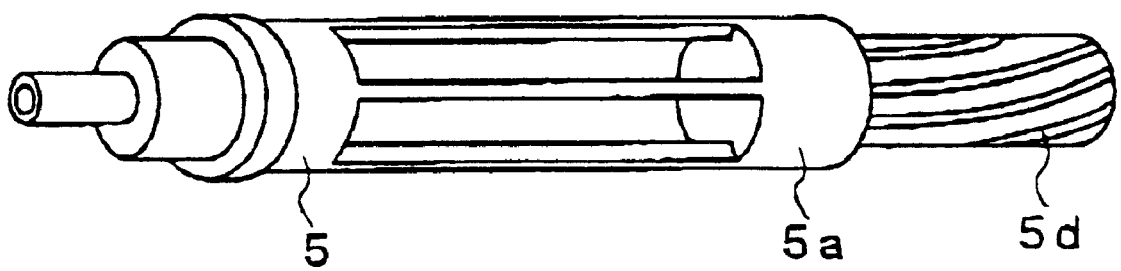
FIG. 10 is a schematic configuration view showing another example of a four-sided discharging type nozzle head according to the present invention.

Another example of a four-sided discharging type nozzle head according to the present invention is explained by FIG. 10. FIG. 10 shows a schematic configuration view of this nozzle head. This nozzle head has a turning vane 5d adjacent to the baffle body 5a on an opposite side to the nozzle. The turning vane 5d and the baffle body 5a have the same central axis. That is, this nozzle head has the flow baffle 5 with the turning vane 5d. The other elements of this nozzle head are almost the same as FIG. 6A.

In this case, the turning vane 5d is turned by the collision jet which changed its flow direction by the collision with an object to be treated, and this rotation of the turning vane 5d assists a rotation of the baffle body 5a on its axis.

Figure 11:
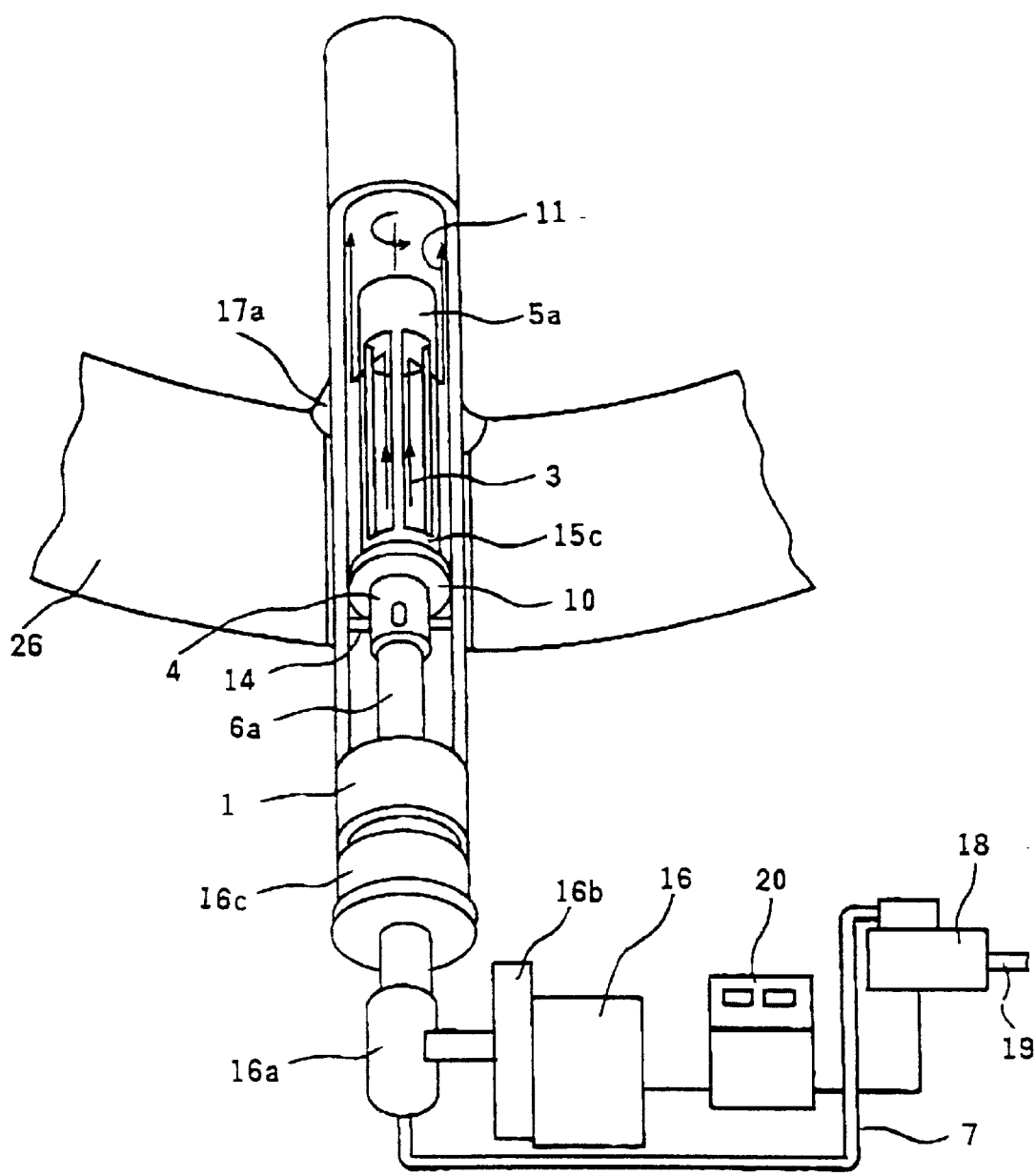
FIG. 11 is a schematic configuration view showing a state that a WJP method according to the third embodiment of the present invention is applied to an inner surface of a horizontal weld portion of an ICM housing.

The third embodiment, in which the WJP method according to the present invention is applied to an inner surface of a horizontal weld portion (or line) of an ICM housing in a BWR, is explained using FIG. 11. FIG. 11 is a schematic configuration view which shows a state that a nozzle head 15c with a back-flow obstructive plate 10 is set at the inner surface of the horizontal weld portion 17a of the ICM housing 1. As shown in FIG. 4A, the ICM housing 1 pierces a bottom head 26 of the RPV 13 and is fixed to the bottom head 26.

The nozzle head 15c corresponds to the nozzle head 15b (shown in FIG. 8) to which the back-flow obstructive plate 10 is added on a nozzle side. Since the nozzle head 15c has the back-flow obstructive plate 10, a sealing portion located at a lower end of the ICM housing 1 is protected for sealing water.

In this nozzle head 15c, the collision jet, which changed its flow direction opposite to an initial flow direction of the jet 3 by the collision with the buffle body 5a, can change (be repelled) its flow direction to the initial flow direction by a collision with the back-flow obstructive plate 10. Interference between this repelled collision jet and the initial collision jet makes a turbulent flow, and this turbulent flow can make the peening effect higher.

As shown in FIG. 11, an apparatus used for execution of the WJP to the horizontal weld portion 17a of the ICM housing 1 has a lifting shaft 6a with a lifting guide 14 mounting the nozzle head 15c, a nozzle head drive unit 16 having a nozzle rotating means 16a provided at a lower end of the lifting shaft 6a and a nozzle lifter 16b, a high-pressure hose 7 and a booster pump 18 for supplying pressurized water to a nozzle 4, a water supply hose 19 for supplying water to the booster pump 18, and a control panel 20 for controlling the nozzle head drive unit 16 and the booster pump 18.

The WJP is executed using the above apparatus in accordance with the following steps.

(1) Disconnection

A top head of the RPV, a steam drier, a shroud head, fuel assemblies and control rods are removed from the RPV. In this state, the RPV 13 and a reactor well are filled with core water 22.

(2) Water Sealing for Upper End of ICM Guide Tube

The upper end of the ICM guide tube above the ICM housing 1 shown in FIG. 1A is plugged for sealing water.

(3) Removal of ICM Detector

The ICM detector (not shown) contained in the ICM guide tube is removed from the lower end of the ICM housing 1.

(4) Confirmation of Welding Position

An ultrasonic sensor (not shown) or the like is inserted from the lower end of the ICM housing 1 to confirm a position of the horizontal weld portion 17a and an execution range of the WJP.

(5) Preparation for Execution of WJP

This step has next steps of a) to e).

a) Setting of WJP Apparatus

A nozzle drive shaft 16c mounting the nozzle head 15c at the leading end is inserted in the ICM housing 1. The nozzle head drive unit 16, control panel 20 and the booster pump 18 are disposed as shown in FIG. 4A. The booster pump 18 is connected to a source water tank (not shown) by the water supply hose 19. The booster pump 18 is connected to a WJP main body by the high-pressure hose 7. Wiring between these devices is laid out, and these devices are adjusted.

b) Setting of Execution Conditions

A flow rate and a discharging period (time) of the jet, a moving speed and a moving range of the nozzle head in an axial direction, and a turning speed and a turning range of the nozzle head in a peripheral direction are set.

c) Confirmation of Operation of Apparatus

The nozzle head 15c is moved according to the setting conditions in a state in which the jet is not discharged, to confirm whether or not the execution range is suitable, the nozzle head 15c is smoothly moved, and the like.

d) Release of Sealing of Upper End of ICM Guide Tube

The plugging of the upper end of the ICM guide tube is released.

e) Trial Discharge of Jet

The trial discharge of the jet 3 is performed for conforming looseness of pipes, a vibrational state, and the like. In this way, the setting of the WJP apparatus is terminated.

(6) Execution of WJP

The jet 3 is discharged to start execution of the WJP to the horizontal weld portion 17a.

(7) Confirmation of Execution of WJP

This step has next steps of a) to d).

a) Sealing for Upper End of ICM Guide Tube

The upper end of the ICM guide tube is plugged for sealing water.

b) Removal of Nozzle Drive Shaft

The nozzle drive shaft 16c is removed from the ICM housing 1.

c) Setting of Monitor Camera

The monitor camera 30 is inserted in the ICM housing 1 and is set in co-operation with the monitor video 31.

d) Confirmation of Execution of WJP

It is confirmed that the WJP is suitably executed by the monitor camera 30.

(8) Withdrawal of WJP Apparatus

This step has next steps of a) to b).

a) Withdrawal of Monitor Camera

The monitor camera 30 is removed from the ICM housing 1 to be withdrawn.

b) Withdrawal of WJP Apparatus

The wiring and piping between the above devices are removed, and the devices, pipes for piping, and wires for wiring are withdrawn.

(9) Mounting of ICM Detector

The ICM detector is inserted from the lower end of the ICM housing 1 to be mounted.

(10) Release of Sealing of Upper End of ICM Guide Tube

The plugging of the upper end of the ICM guide tube is released. In this way, the execution of the WJP is terminated.

(11) Synchronization

The fuel assemblies, the control rods, the shroud head, the steam drier and the too head of the RPV are lowered and assembled to be restored.

By executing (applying) the WJP with the above steps to the horizontal weld portion of the ICM housing in the RPV filled with the core water, it is possible to collapse cavitation bubbles with high collapse pressures on a surface of the horizontal weld portion. Accordingly, the residual stress on the surface of the horizontal weld portion can be improved and a damage such as the SCC can be prevented.

In this embodiment, the nozzle head 15c with the back-flow obstructive plate 10 is used. However, the nozzle head 15a and 15b shown in FIGS. 2 and 6 are also can be used in the above steps.

Figure 12:
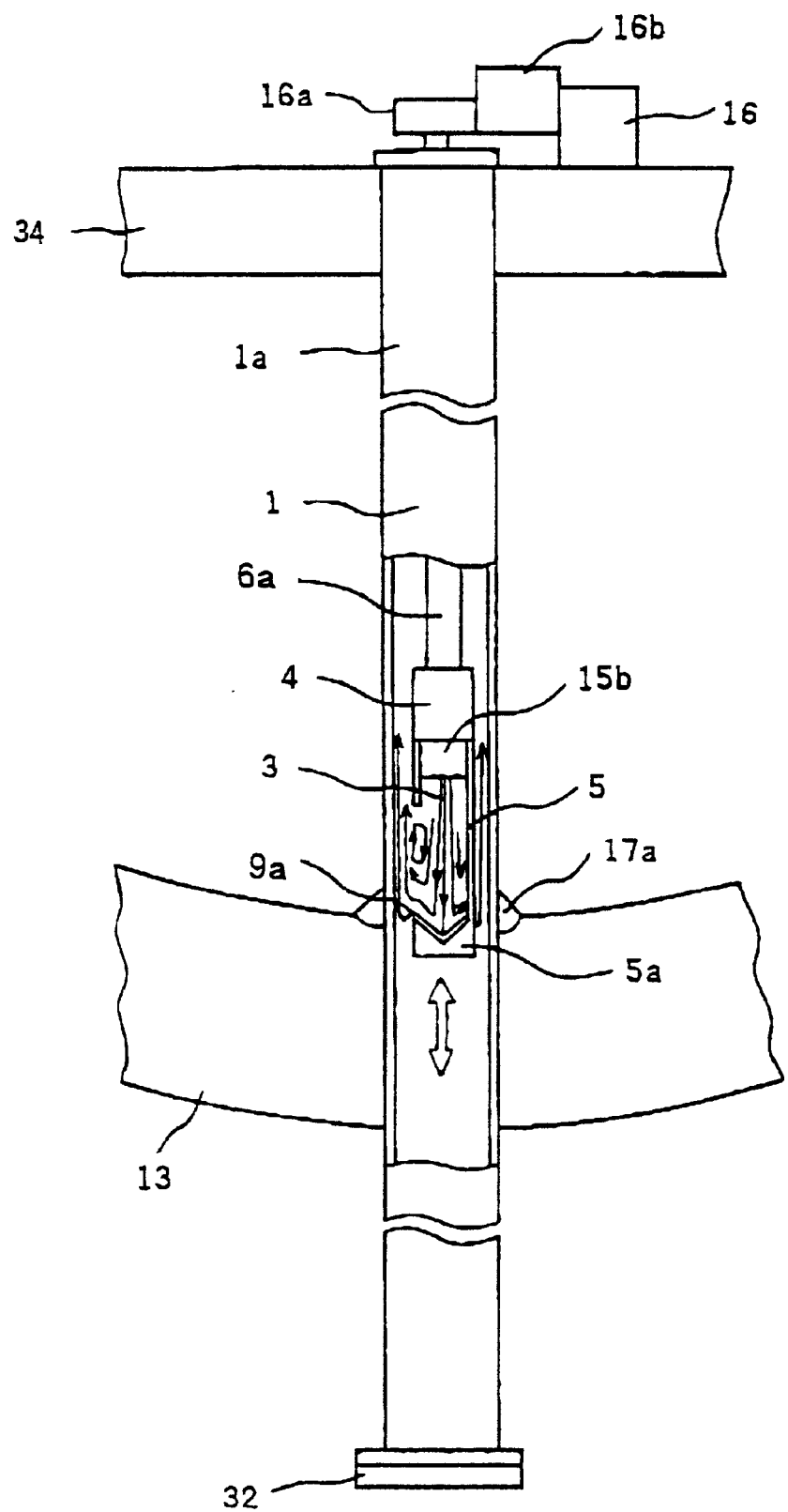
FIG. 12 is a schematic configuration view showing a state that a WJP method according to the fourth embodiment of the present invention is applied to an inner surface of FIG. 13 is a diagram showing one example of an improvement effect of a residual stress by using the four-sided discharging type nozzle head shown in FIG. 6A.

The fourth embodiment, in which the WJP method according to the present invention is applied to an inner surface of a horizontal weld portion of an ICM housing in a BWR, is explained using FIG. 12. In the third embodiment, the nozzle head is inserted from the lower end of the ICM housing, however, in this embodiment, the nozzle head is inserted from the upper end of the ICM housing. In this embodiment, The nozzle head 15b shown in FIG. 8 is used. FIG. 12 is a schematically constructional view which shows a state that the nozzle head 15b is set at the inner surface of the horizontal weld portion 17a of the ICM housing 1.

Executing steps of WJP according to this embodiment is explained below.

(1) Disconnection

A top head of the RPV, a steam drier, a shroud head, fuel assemblies and control rods are removed from the RPV. In this state, the RPV 13 and a reactor well are filled with core water 22.

(2) Water Sealing for Upper End of ICM Guide Tube and Removal of ICM Detector

This step has next steps of a) to b).

a) The upper end of the ICM guide tube above the ICM housing 1 shown in FIG. 1A is plugged for sealing water. In FIG. 12, 34 is a core support.

b) The ICM detector (not shown) contained in the ICM guide tube 1a is removed from the lower end of the ICM housing 1.

(3) Water Sealing for Lower End of ICM Housing and Release of Sealing for Upper End of ICM Guide Tube This step has next steps of a) to b).

a) A closing flange 32 is mounted at the lower end of the ICM housing 1 for sealing water.

b) The plugging of the upper end of the ICM guide tube is released.

(4) Confirmation of Welding Position

An ultrasonic sensor (not shown) or the like is inserted from the upper end of the ICM guide tube 1a to confirm a position of the horizontal weld portion 17a and an execution range of the WJP.

(5) Preparation for Execution of WJP

This step has next steps of a) to d).

a) Setting of WJP Apparatus

A lifting shaft 6a mounting the nozzle head 15b at the leading end is inserted in the ICM housing 1 from an upper side. A nozzle head drive unit 16, a control panel 20 and a booster pump 18 are disposed. The booster pump 18 is connected to a source water tank (not shown) by the water supply hose 19. The booster pump 18 is connected to a WJP main body by a high-pressure hose 7. Wiring between these devices is laid out, and these devices are adjusted. The arrangement of these devices in this case are substantially the same as those shown in FIG. 4A. Therefore, the explanation thereof is omitted.

b) Setting of Execution Conditions

A flow rate and a discharging period (time) of the jet, a moving speed and a moving range of the nozzle head in an axial direction, and a turning speed and a turning range of the nozzle head in a peripheral direction are set.

c) Confirmation of Operation of Apparatus

The nozzle head 15b is moved according to the setting conditions in a state in which the set is not discharged, to confirm whether or not the execution range is suitable, the nozzle head 15c is smoothly moved, and the like.

d) Trial Discharge of Jet

The trial discharge of the jet 3 is performed for conforming looseness of pipes, a vibrational state, and the like. In this way, the setting of the WJP apparatus is terminated.

(6) Execution of WJP

The jet 3 is discharged to start execution of the WJP to the horizontal weld portion 17a.

(7) Confirmation of Execution of WJP

This step has next steps of a) to c).

a) Removal of Nozzle Drive Shaft

The nozzle drive shaft (not shown) is removed from the ICM housing 1.

b) Setting of Monitor Camera

The monitor camera is inserted in the ICM housing 1 and is set in co-operation with the monitor video.

c) Confirmation of Execution of WJP

It is confirmed that the WJP is suitably executed by the monitor camera.

(8) Withdrawal of WJP Apparatus

This step has next steps of a) to b).

a) Withdrawal of Monitor Camera

The monitor camera is removed from the ICM housing 1 to be withdrawn.

b) Withdrawal of WJP Apparatus

The wiring and piping between the above devices are removed, and the devices, pipes for piping, and wires for wiring are withdrawn.

(9) Water Sealing for Upper End of ICM Guide Tube, Mounting of TCM Detector, and Release of Sealing of Upper End of ICM Guide Tube This step has next steps of a) to c).

a) The upper end of the ICM guide tube 1a is plugged for sealing water.

b) The closing flange 32 at the lower end of the ICM housing 1 is removed, and the ICM detector is inserted to be mounted.

c) The plugging of the upper end of the ICM guide tube 1a is released. in this way, the execution of the WJP is terminated.

(10) Synchronization

The fuel assemblies, the control rods, the shroud head, the steam drier and the top head of the RPV are lowered and assembled to be restored.

In this embodiment, since the nozzle head 15b having the baffle body 5a with the recessed surface (collision surface) is used, a central flow in the jet 3 changes its flow direction by the collision with a central portion of the recessed surface and then flows along the recessed surface, thereby a strong turbulent flow is generated by interference between the direction-changed flow and an outer flow in the jet 3. A collision jet generated like this flows upward in the ICM housing 1, and is finally discharged into the RPV 13 because the closing flange 32 is mounted at the lower end of the ICM housing 1.

Since the collapse pressures of the cavitation bubbles become higher by a strong turbulent flow generated near the recessed surface, a high improvement effect of the residual stress can be obtained. Accordingly, in this embodiment, the residual stress on the surface of the horizontal weld portion of the ICM housing can be improved and damage such as the SCC can be prevented like in the third embodiment.

Figure 13:
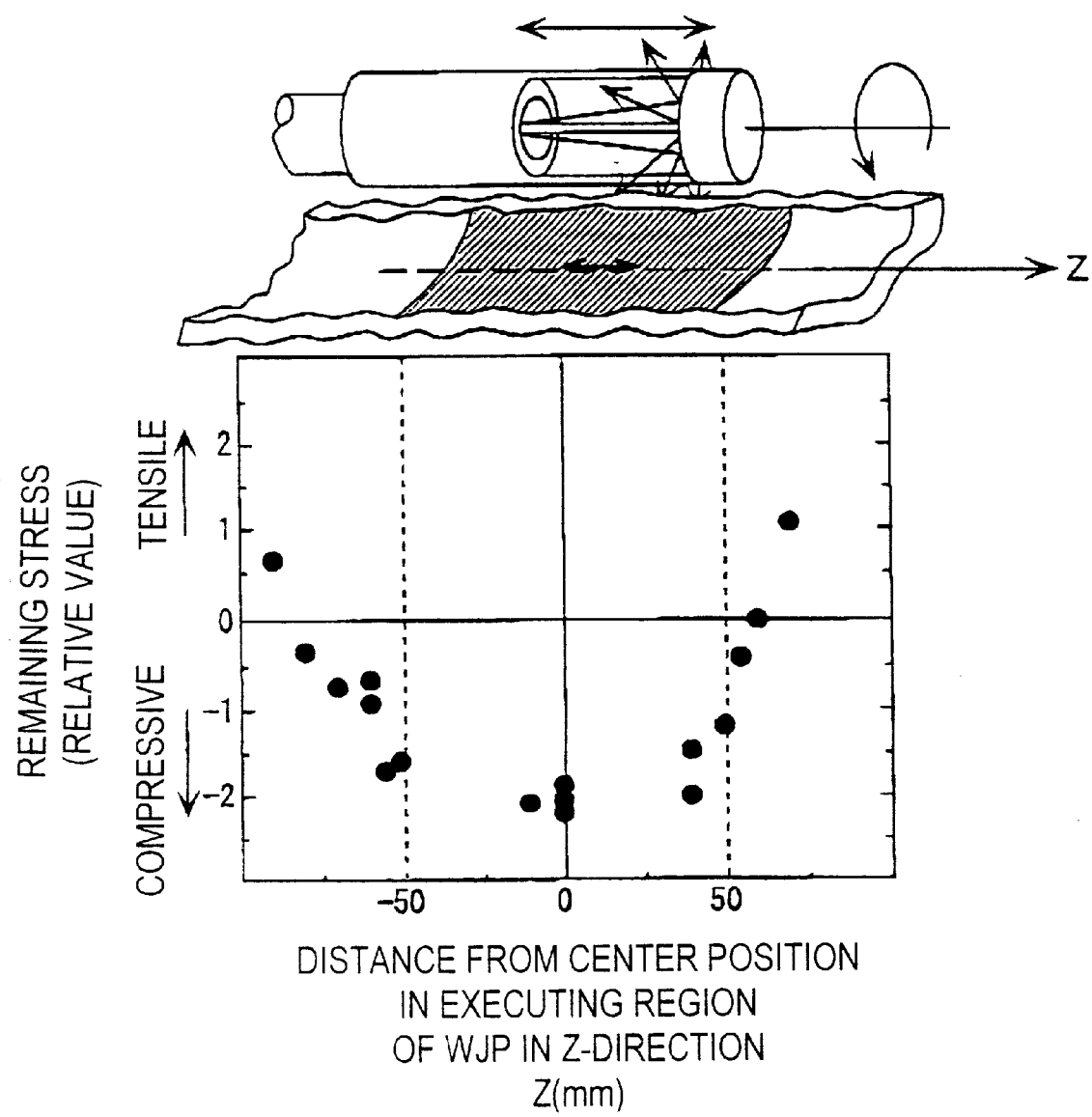

FIG. 13 shows one example of the improvement effect of the residual stress by using the four-sided discharging type nozzle head 15b shown in FIG. 6A. The nozzle 4 having an outer diameter of 30 mm and a hole diameter of 2 mm is used. The baffle body 5a is arranged so as to make the collision distance of 80 mm and the collision angle of 90°.

FIG. 13 shows a measurement result of the residual stress on an inner surface of a test tube with an inner diameter of 38 mm after executing the WJP to the inner surface of the test tube using this nozzle head 15b. The WJP is executed in a condition that the nozzle head is moving to an axial direction (Z-direction) of the test tube.

In FIG. 13, a vertical axis is a relative measurement value of the residual stress, and a horizontal axis is a distance from a center position in an executing region of WJP in the Z-direction. A positive residual stress is a tensile residual stress, and a negative residual stress is a compressive residual stress. The test tube is divided into three pieces, and its surface is subjected to surface grinding so as to have a tensile residual stress of about 400 MPa as an initial residual stress.

As shown in FIG. 13, the initial tensile residual stress is improved to the compressive residual stress by executing the WJP. Since it is known that no SCC and no fatigue fracture occur under the compressive stress, it is possible to prevent the SCC and the fatigue fracture by applying the above-mentioned WJP in accordance with the present invention.

While the WJP methods according to the present invention are applied to the structural members in the RPV in the above-mentioned embodiments, objects applied by these WJP methods are not limited in this. That is, these WJP methods can be applied to tubes in a nuclear plant, general industrial machines and ships.

What is claimed is:

1. A preventive maintenance apparatus of a structural member in a reactor pressure vessel for reducing a tensile residual stress on a surface thereof, comprising:

a nozzle for discharging a water jet into core water in a reactor pressure vessel;

a deflector having a plane surface which is impinged by said water jet to change direction of flow of said water jet discharged from the nozzle and impinge the water jet after being deflected onto the surface of the structural member to be treated; and a support maintaining a predetermined distance between the nozzle and the plane surface of the deflector.

2. A preventive maintenance apparatus of a structural member in a reactor pressure vessel according to claim 1, wherein said support maintains the distance between the nozzle and the plane surface of the deflector at most 100 times as large as a hole diameter of the nozzle.

3. A preventive maintenance apparatus of a structural member in a reactor pressure vessel according to claim 1, wherein said support maintains an angle, formed between a central axis passing through an opening of the nozzle and said plane surface of the deflector, in a range of 40° to 90°.

4. A preventive maintenance apparatus of a structural member in a reactor pressure vessel according to claim 1, wherein said support has one opening for discharging the direction-changed flow of the water jet near the plane surface of the deflector.

5. A preventive maintenance apparatus of a structural member in a reactor pressure vessel according to claim 1, wherein said support has openings for discharging the direction-changed flow of the water jet near the plane surface of the deflector, said openings being arranged in a peripheral direction with respect to a central axis passing through an opening of the nozzle.

6. A preventive maintenance apparatus of a structural member in a reactor pressure vessel according to claim 1, further comprising a pressurized water supply for supplying pressurized water to the nozzle.

7. A preventive maintenance apparatus of a structural member in a reactor pressure vessel for reducing a tensile residual stress on a surface thereof, comprising:

a nozzle for discharging a water jet into core water in a reactor pressure vessel;

a deflector having a recess which is impinged by the water jet to change direction of flow of the water jet discharged from the nozzle and impinge the water jet after being deflected onto the surface of the structural member to be treated; and a support maintaining a predetermined distance between the nozzle and the recess of the deflector.

8. A preventive maintenance apparatus of a structural member in a reactor pressure vessel according to claim 7, wherein said recess is in a shape of a cone with an apex angle of at least 120° in a longitudinal cross section thereof.

9. A preventive maintenance apparatus of a structural member in a reactor pressure vessel according to claim 8, wherein said support has openings for discharging the direction-changed flow of the water jet near the recess of the deflector, said openings being arranged in a peripheral direction with respect to a central axis passing through an opening of the nozzle.

10. A preventive maintenance apparatus of a structural member in a reactor pressure vessel according to claim 8, wherein said recess of the deflector has spiral grooves or spiral projections for causing the direction-changed flow of the water jet to revolve with respect to the central axis passing through the opening of the nozzle.

11. A preventive maintenance apparatus of a structural member in a reactor pressure vessel according to claim 7, further comprising a pressurized water supply for supplying pressurized water to the nozzle.

* * * * *